W. M. WHITE AND A. GAUSLIN.
LEAF SPRING OILER.
APPLICATION FILED JUNE 17, 1919.
1,339,872.  
Patented May 11, 1920.
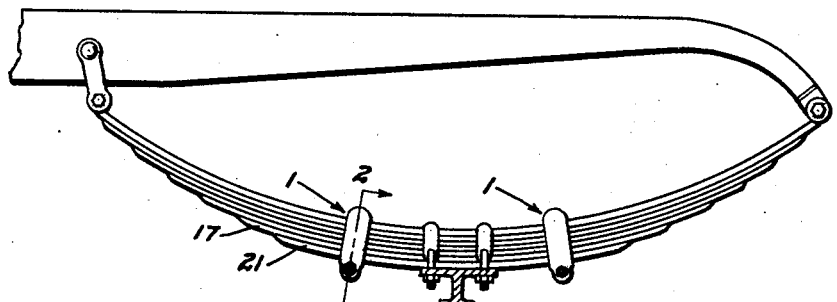
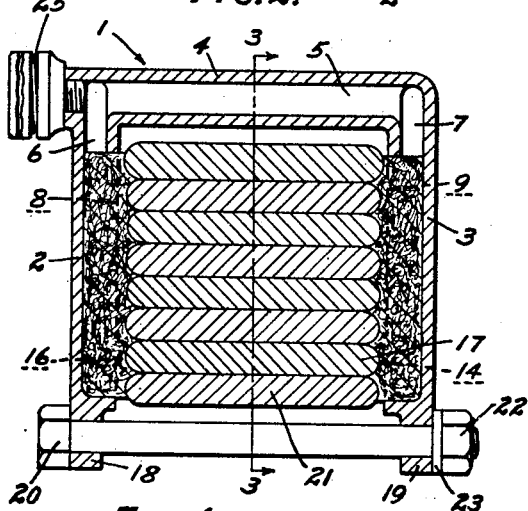
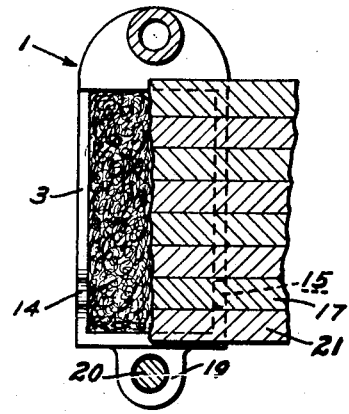
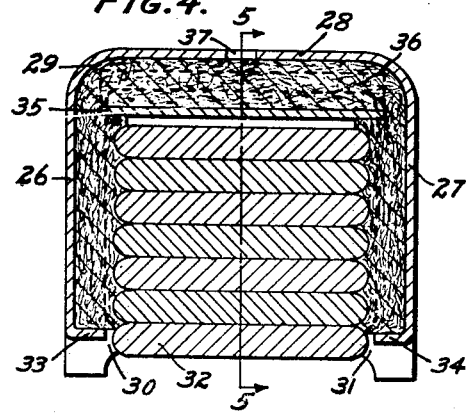
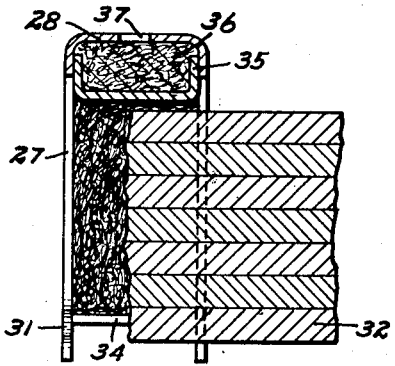
INVENTORS  
WILLIAM M. WHITE  
ANTHONY GAUSLIN  
BY Hazard & Miller  
ATT'YS.

UNITED STATES PATENT OFFICE.

WILLIAM M. WHITE AND ANTHONY GAUSLIN, OF TRONA, CALIFORNIA.

LEAF-SPRING OILER.

1,339,872.      Specification of Letters Patent.      Patented May 11, 1920.

Application filed June 17, 1919. Serial No. 304,938.

*To all whom it may concern:*

Be it known that we, WILLIAM M. WHITE and ANTHONY GAUSLIN, citizens of the United States, residing at Trona, in the county of San Bernardino and State of California, have invented new and useful Improvements in Leaf-Spring Oilers, of which the following is a specification.

Our object is to make a leaf spring oiler, and our invention consists of the novel features herein shown, described and claimed.

Figure 1 is a side elevation of a leaf spring provided with leaf spring oilers in accordance with the principles of our invention.

Fig. 2 is an enlarged sectional detail on the line 2—2 of Fig. 1.

Fig. 3 is a fragmentary sectional detail on the line 3—3 of Fig. 2, and looking in the direction indicated by the arrows.

Fig. 4 is a view analogous to Fig. 2 and showing a modified construction.

Fig. 5 is a fragmentary sectional detail on the line 5—5 of Fig. 4.

The oiler housing 1, shown in Figs. 1, 2 and 3 consists of the channel side pieces 2 and 3 and the center piece 4 connecting the upper ends of the side pieces 2 and 3. The pieces 2, 3 and 4 are preferably cast integral and the casting is cored to form the chamber 5 extending through the piece 4 and the chamber 6 extending downwardly from one end of the chamber 5 in the piece 2, and the chamber 7 extending downwardly from the other end of the chamber 5 in the piece 3.

The chambers 6 and 7 communicate with openings 8 and 9 leading inwardly through the pieces 2 and 3. Wickings 12 and 13 are packed in the chambers 6 and 7 and extend through the openings 8 and 9. Lugs 14 and 15 extend inwardly from the piece 3 at opposite sides of the opening 9 and near the lower end of the opening. Similar lugs 16 extend inwardly from the piece 2 at opposite sides of the opening 8 and near the lower end of the opening, said lugs being adapted to engage the edges of the leaf 17 of the spring so as to grip the leaf and hold the oiler in place.

Ears 18 and 19 extend downwardly from the pieces 2 and 3, and a clamping bolt 20 is inserted through the ears below the lower leaf 21, and a nut 22 is applied to the bolt against the spring washer 23.

The oiler is prepared and then inserted downwardly straddle of the spring and the pieces 2 and 3 spread enough to allow the lugs 14, 15 and 16 to snap over the edges of the leaves until the leaf 17 is reached, and then the bolt 20 is applied and the nut 22 tightened to clamp the oiler in place and to force the lugs 14, 15 and 16 against the leaf 17 so as to establish a rigid metallic contact between the oiler and the spring at the desired place.

A grease gun nipple 25 is formed at the upper end of the side piece 2 in line with the center piece 4, so that the grease gun may be attached to force grease through the nipple 25 into the chamber 5 and downwardly into the chambers 6 and 7 to saturate the wickings 12 and 13.

The grease or oil will pass from the wickings between the leaf of the spring by capillary force and will be distributed lengthwise of the spring to lubricate the spring.

In the modification shown in Figs. 4 and 5 the oiler housing comprises the side pieces 26 and 27 and the top piece 28 all formed integral to produce a chamber 29 opening inwardly all the way around, and lugs 30 and 31 extending inwardly at the lower ends of the side pieces 26 and 27 to engage the lower leaf 32. The pieces 26, 27 and 28 are channel-shaped except that the lower ends of the channels are closed by the flanges 33 and 34.

An inverted channel 35 is inserted upwardly into the piece 28 and wicking 36 is packed in the channels all the way around so as to press against the edges of the leaf of the spring. An oil hole 37 is formed through the upper wall of the piece 28, so that oil may be supplied to the wicking 36 from a squirt can or the like.

The construction shown in Fig. 4 may be snapped on to the spring, the lugs 30 and 31 passing downwardly from one leaf to the next until the lower leaf 32 is reached and then the tension of the metal will hold the oiler in place.

Thus we have produced a leaf spring oiler comprising a frame adapted to be inserted downwardly straddle of a leaf spring and having a chamber opening inwardly to the edges of the leaves, wicking in the chamber against the edges of the leaves, and means for supplying the wicking with oil or grease.

Various changes may be made without departing from the spirit of our invention as claimed.

We claim:

1. A leaf spring oiler comprising a U-shaped, channel frame adapted to be inserted downwardly straddle of a leaf spring, lugs extending from the inner edges of the flanges of the sides of the frame and adapted to engage the edges of a leaf and operative solely to hold the frame in place.

2. A leaf spring oiler comprising a U-shaped frame of channel iron adapted to be inserted downwardly straddle of a leaf spring and forming a chamber opening inwardly to the edges of the leaves, wicking in the chamber and adapted to bear against opposite edges of the leaves, and a pressure member containing wicking loosely mounted in the transverse head of the frame and by which the wicking is compressed at the upper part so as to feed oil gradually to the leaves.

3. A leaf spring oiler comprising a U-shaped frame of channel iron adapted to be inserted downwardly straddle of a leaf spring and forming a chamber opening inwardly to the edges of the leaves, wicking in the chamber and adapted to bear against opposite edges of the leaves, and a pressure member loosely mounted in the transverse head of the frame and by which the wicking is compressed at the upper part so as to feed oil gradually to the leaves, the web of the channel turned in to support the wicking and retain the lubricant on the ends thereof.

4. A leaf spring oiler including a U-shaped frame adapted to be inserted downwardly straddle of a leaf spring, and lugs extending from the lower end of the legs of the frame and adapted to engage the edges of the lower leaf of the spring to hold the frame in place on the spring, the frame containing an oiled packing for oiling the spring.

In testimony whereof we have signed our names to this specification.

W. M. WHITE.
ANTHONY GAUSLIN.